US008910187B2

(12) United States Patent
Liang et al.

(10) Patent No.: US 8,910,187 B2
(45) Date of Patent: Dec. 9, 2014

(54) METHOD AND APPARATUS FOR NON-INTRUSIVE WEB APPLICATION INTEGRATION TO STREAMLINE ENTERPRISE BUSINESS PROCESS

(75) Inventors: Haiqi Liang, Beijing (CN); Wei Sun, Beijing (CN); Kuo Zhang, Beijing (CN); Xin Zhang, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1810 days.

(21) Appl. No.: 11/843,242

(22) Filed: Aug. 22, 2007

(65) Prior Publication Data

US 2008/0072239 A1    Mar. 20, 2008

(30) Foreign Application Priority Data

Aug. 22, 2006  (CN) .......................... 2006 1 0121305

(51) Int. Cl.
*G06F 3/00* (2006.01)
*G06F 9/44* (2006.01)
*G06F 9/46* (2006.01)
*G06F 13/00* (2006.01)
*G06F 11/34* (2006.01)
*G06Q 10/06* (2012.01)

(52) U.S. Cl.
CPC .......... *G06F 11/3476* (2013.01); *G06F 9/4443* (2013.01); *G06F 2201/875* (2013.01); *G06F 2201/86* (2013.01); *G06F 11/3495* (2013.01); *G06Q 10/06* (2013.01)
USPC ......................................... 719/318; 709/224

(58) Field of Classification Search
CPC ... G06Q 10/06; G06F 9/4443; G06F 11/3476; G06F 2201/875; G06F 2201/86; G06F 11/3495

See application file for complete search history.

(56) References Cited

U.S. PATENT DOCUMENTS

| 6,360,249 | B1 | 3/2002 | Courts |
| 7,085,682 | B1 * | 8/2006 | Heller et al. .................. 702/186 |
| 7,506,195 | B2 | 3/2009 | Takahashi |

(Continued)

FOREIGN PATENT DOCUMENTS

WO   WO 0102932 A2 *  1/2001

OTHER PUBLICATIONS

Guo, Li, et al, "Mapping a Business Process Model to a Semantic Web Service Model", IEEE International Conference on Web Services, Jul. 2004.

(Continued)

*Primary Examiner* — H S Sough
*Assistant Examiner* — Kimberly Jordan
(74) *Attorney, Agent, or Firm* — Janice Kwon; William Stock; Anne Vachon Dougherty

(57) ABSTRACT

A method and apparatus for capturing Web page events of a client in a computer network, for performing Web event analysis of user interface event messages from a client to generate a Web application event message, and for capturing and analyzing Web page events of a client to generate a Web application event message in a computer network. Web page events at a client are captured to generate user interface event messages, A Web event analysis is performed on the user interface event messages to generate integration event messages, and a Web application event message is generated according to correlation patterns among the integration event messages so as to trigger a corresponding subsequent action.

21 Claims, 10 Drawing Sheets

(56) References Cited

U.S. PATENT DOCUMENTS

| | | |
|---|---|---|
| 7,752,308 B2 * | 7/2010 | Hutchinson .................. 709/224 |
| 2002/0165954 A1 * | 11/2002 | Eshghi et al. ................ 709/224 |
| 2002/0184363 A1 * | 12/2002 | Viavant et al. ............... 709/224 |
| 2003/0105884 A1 | 6/2003 | Upton |
| 2003/0149799 A1 | 8/2003 | Shattuck |
| 2004/0162741 A1 | 8/2004 | Flaxer |
| 2004/0254945 A1 | 12/2004 | Schmidt |
| 2005/0086360 A1 | 4/2005 | Mamou |
| 2006/0041862 A1 | 2/2006 | Moussallam |

OTHER PUBLICATIONS

Shas, "End Data Chaos with a Data Integration Framework", DM Review, Nov. 2004.

* cited by examiner

Figure 5
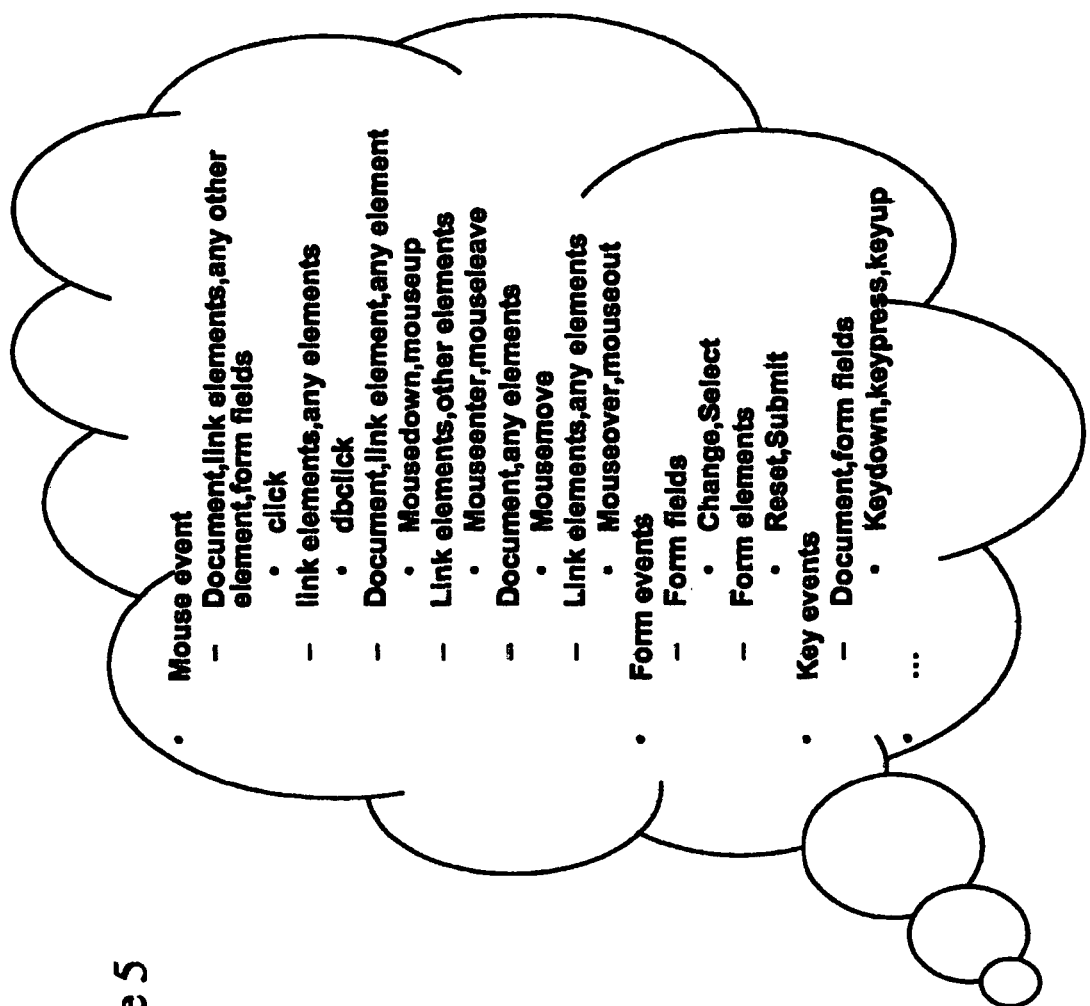
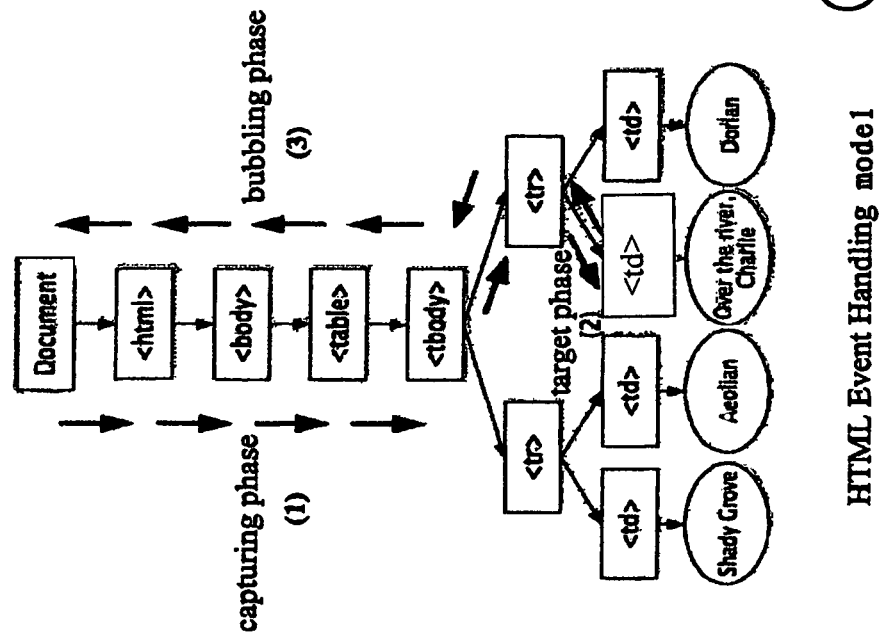
HTML Event Handling model

FIGURE 8

| ITEM ORDERED | ^ |
| SHIPMENT INFORMATION | ^ |
| PAYMENT INFORMATION | ^ |
| DATE | ^ |

NEXT>   CANCEL

DRAFT ^

ORDER DATE ^
ORDER ADDRESS
STATE ^

CREDIT CARD NUMBER ^
EXPIRATION DATE ^

<BACK   NEXT>   CANCEL

ORDER CONFIRMATION
ITEM ORDERED
SHIPMENT INFORMATION
PAYMENT INFORMATION
COMMENTS

SUBMIT   RESET

METHOD AND APPARATUS FOR NON-INTRUSIVE WEB APPLICATION INTEGRATION TO STREAMLINE ENTERPRISE BUSINESS PROCESS

TECHNICAL FIELD OF THE INVENTION

The present invention generally relates to the field of Web services and applications, and more particularly, relates to a method, apparatus and system for capturing and/or analyzing Web events which have occurred in networked computers (or clients) and then accomplishing Web application integration in a computer network.

BACKGROUND OF THE INVENTION

In recent years, with the fast development of computer and network technologies, browser-based applications, generally also referred to as Web applications, are widely developed to satisfy various enterprise and personal requirements.

With the rapid increase of various applications used inside enterprises, especially with the popularity of the Internet and XML technologies, while more and more enterprises are converting their own business into the E-Commerce, they find that an isolated information system cannot effectively provide comprehensive information across departments and systems and cannot accomplish real time information access and see-through business flows. A business flow of an enterprise may involve multiple application systems at the same time, therefore, it is required that these systems should cooperate with each other. However, inconsistency of interfaces and architectures often causes application systems that should be tightly integrated together to become one or more "Information Isolated Islands". Thus, an Enterprise Application Integration (EAI) technology emerges as the times require. The EAI technology can connect various business-related heterogeneous systems, applications and data sources inside/outside an enterprise by using a middleware as a "bus" to connect various existing isolated applications to the bus, like various components of a personal computer (PC), to form an integrated enterprise business system for seamlessly sharing and exchanging data between important systems, such as the E-Commerce, Enterprise Resource Planning (ERP), Customer Relationship Management (CRM), Supply Chain Management (SCM), Office Automation (OA), Enterprise Information System (EIS), Database, Data Ware, etc.

For example, an employee in a company usually uses multiple Web applications in his daily work, which may be provided by different providers distributed over the Internet and Intranet. Moreover, in many cases, one or more applications are related to the company's regulations or business processes. To be compliant with the company's regulations or business processes, during the interaction of the employee in the company with the Web applications, these applications should be correlated with each other through Web events. For example, an order generation process may involve both a CRM application and an ERP application; a part of the process instance should be streamlining Web events of the CRM application and the ERP application. In summary, the Web events which occurred within the company should be correlated and analyzed so as to be compliant with the company's regulations or business processes. The Web events should be captured first before they can be correlated. One method of capturing the Web events is to add event monitoring capability into corresponding HTML Web pages. This is an intrusive method, since original Web pages need to be revised adaptively. However, in the general cases described above, those applications are out of the control of the company and the Web pages cannot be revised by the company.

In addition, there exists a proxy-based method which enables non-intrusive revision of the Web pages and has been widely used. The basic concept of the proxy-based method is to revise some codes in an original HTML DOM (Document Object Model) tree or add some codes thereto when a Web page is being accessed via a proxy server. To capture a Web event, the proxy-based method will add an event monitoring function into the Web page and, when an event occurs during the user's interaction, will send the event to the proxy server. The shortcoming of this method lies in the fact that the proxy server needs to parse and revise the HTML Web page whenever the Web page is accessed, which will degrade the Internet accessing performance.

Another important issue herein is how to specify correlation relationships among these Web applications and how to identify correlation patterns among them given that a series of Web events have been captured. A correlation pattern typically represents a certain business regulation or business process. The above issue has not been addressed in the prior art.

In the prior art, existing Web application event capture/generation solutions can be categorized into two types of methods: the first type which uses Polling Services to monitor the Web application events, and the second type which uses Web page UI (User Interface) event registration through code injection. Both of these two types of methods have shortcomings, and are inefficient, costly, or both.

Taking the first type of method, i.e. polling services as an example, in usual cases, Web application ISVs (Independent Software Venders) provide Web services for accessing a data center so that customers can use APIs (Application Programming Interfaces) to synchronize different systems. One of such methods is used to leverage scheduling services (i.e., perform polling), e.g., per hour or at 12:00 pm every day, to synchronize data of two or more systems. Although Web service is a better method for synchronizing information of Web applications with the EIS, this method also has obvious drawbacks. For example, the system cannot know when to poll; many Web applications even do not provide Web service interfaces; and if scheduling time slices are set to be small, then the load of the whole system will be tremendous. In the alternative, implementing inconsistent time slices will be useless.

The second type of method is more efficient than the first type of method. For example, each of the U.S. Pat. No. 6,944,660 and U.S. Pat. No. 6,442,563 and the US Patent Application Publication No. US2002/0165954A1 has disclosed a browser-based UI event triggering method which collects browser-based information to trigger workflow actions or to trigger monitoring of these actions by using Web page events. However, the methods described in the above patents and patent publications are based on injecting script tags into the Web pages. Accordingly, the aforementioned methods need to make intrusive modifications to the Web pages or make intrusive redesigns of the Web pages. However, in most cases, the Web application providers do not provide the Web page modification capability at all. In other words, code injection is an ad-hoc way and not easy to be generalized as a uniform methodology.

It can be seen that, in the prior art, there is no efficient and economic systematic method which can solve the problems of how to specify the correlation relationships among the Web applications and of how to identify the correlation patterns in the cases where a series of Web events have been captured.

SUMMARY OF THE INVENTION

In order to provide basic understanding of some aspects of the present invention, a brief summary of the present invention is given hereinafter. It is to be understood that this summary is not an exhaustive generalization of the present invention. It is not intended to determine critical or important parts of the present invention, nor is it intended to define the scope of the present invention. The summary is only used to give some concepts in a simplified form, the details of which are provided in more detail below.

In order to solve the above-mentioned problems existing in the prior art, an object of the present invention is to provide a method and apparatus for capturing Web page events of a client.

Another object of the present invention is to provide a method and apparatus for performing Web event analysis on user interface event messages from a client so as to generate a Web application event message and then to accomplish Web application integration.

Still another object of the present invention is to provide a method and system for capturing and analyzing Web page events of a client so as to generate a Web application event message in a computer network, which can register and capture Web events from multiple clients, and analyze the correlation patterns among these Web events so as to match a certain business regulation and business process.

Yet still another object of the present invention is to provide a corresponding computer readable storage medium and computer program product for implementing the inventive method.

In order to achieve the above-mentioned objects, according to a first aspect of the present invention, there is provided a method for performing Web event analysis of user interface event messages from a client to generate a Web application event message. The method comprises steps of: receiving useful user interface event messages from the client; mapping the received user interface event messages into integration event messages; determining which sessions the received user interface event messages belong to; dispatching the generated integration event messages to different corresponding channels depending on the different sessions to which the received user interface event messages belong; and generating a Web application event message within each channel according to correlation patterns among the integration event messages.

According to a second aspect of the present invention, there is provided an apparatus for performing Web event analysis of user interface event messages from a client to generate a Web application event message, comprising: an event repository for storing mapping relationships between the user interface event messages and integration event messages; a browser event handler for receiving useful user interface event messages from the client, mapping the received user interface event messages into the integration event messages according to the mapping relationships stored in the event repository, and obtaining necessary useful information from the user interface event messages; an event session manager for determining which sessions the received user interface event messages belong to according to the useful information obtained by the browser event handler, and dispatching the integration event messages to different corresponding channels depending on the different sessions to which the user interface event messages belong; an application event pattern repository for storing correlation patterns among the integration event messages; and one or more application event pattern analyzers for generating a Web application event message within each channel according to the correlation patterns among the integration event messages.

According to a third aspect of the present invention, there is provided a method for capturing Web page events of a client in a computer network, comprises steps of: identifying useful Web page events of the client in response to the client's access to a Web application server through the Internet; recording and monitoring Web page events as monitoring targets among the useful Web page events of the client, and picking up and collecting useful information therefrom; and capturing Web page event messages of the client and performing a Web event process to generate user interface event messages.

According to a fourth aspect of the present invention, there is provided an apparatus for capturing Web page events of a client in a computer network, comprises: a browser navigation monitor for monitoring whether a target Web page to be accessed by a user of the client belongs to Web pages required to be monitored or not; an event configuration repository for storing event configuration information indicating what information is required to be recorded and monitored for capturing and monitoring the Web page events of the client; an event listener register for storing the Web page events required to be recorded and monitored and useful information thereof; an event listener for capturing Web page event messages of the client, and performing a Web event process to generate user interface event messages; and a Web information collector for picking up and collecting useful information from the captured Web page event messages and sending them to the event listener.

According to a fifth aspect of the present invention, there is provided a method for capturing and analyzing Web page events of a client to generate a Web application event message in a computer network, comprising steps of the above method for capturing the Web page events of the client in the computer network, and steps of the above method for performing the Web event analysis of the user interface event messages from the client to generate the Web application event message.

According to a sixth aspect of the present invention, there is also provided a system for capturing and analyzing Web page events of a client to generate a Web application event message in a computer network, comprising: one or more clients capable of accessing a Web application server via the Internet; the above apparatus for capturing the Web page events of the client in the computer network; and an event analyzing and integrating server including the above apparatus for performing the Web event analysis of the user interface event messages from the client to generate the Web application event message.

According to other aspects of the present invention, there are also provided a corresponding computer readable storage medium and computer program product for implementing the invention.

One advantage of the present invention lies in that, by using the methods and apparatus according to the present invention, the Web events of the client can be captured and analyzed in a non-intrusive way, and the correlation patterns among the Web events can be identified and determined, so that the browser-based events can be mapped into business activities, such as integration, to accomplish the Web application integration. It is more efficient and feasible than those conventional ones such as polling and intrusive mechanisms in the prior art.

Another advantage of the present invention lies in that, by using the methods and apparatus according to the present invention, the browser-based events (i.e. Web events) of the client can be captured and/or analyzed in a non-intrusive way in the computer network so that the Internet accessing actions of the client user can be monitored.

These and other advantages of the present invention will be more apparent from the following detailed description of preferred embodiments of the present invention with reference to the drawings.

BRIEF DESCRIPTION OF THE INVENTION

The present invention will be better understood by referring to the following description taken in conjunction with the accompanying drawings, and the same or similar reference signs are used to denote the same or similar elements throughout the drawings. The drawings together with the following detailed description are incorporated into the specification and formed as a part thereof, and are used to further illustrate preferred embodiments of the present invention and explain principles and advantages of the present invention, in which:

FIG. 5 illustrates a typical HTML event handling model and an exemplary script segment for capturing the Web page events of the client;

FIG. 8 illustrates three Web pages used by a user to submit information in order to generate one application event message (i.e. trigger one application event) and corresponding to an exemplary correlation pattern according to an embodiment of the present invention;

Figure 1:
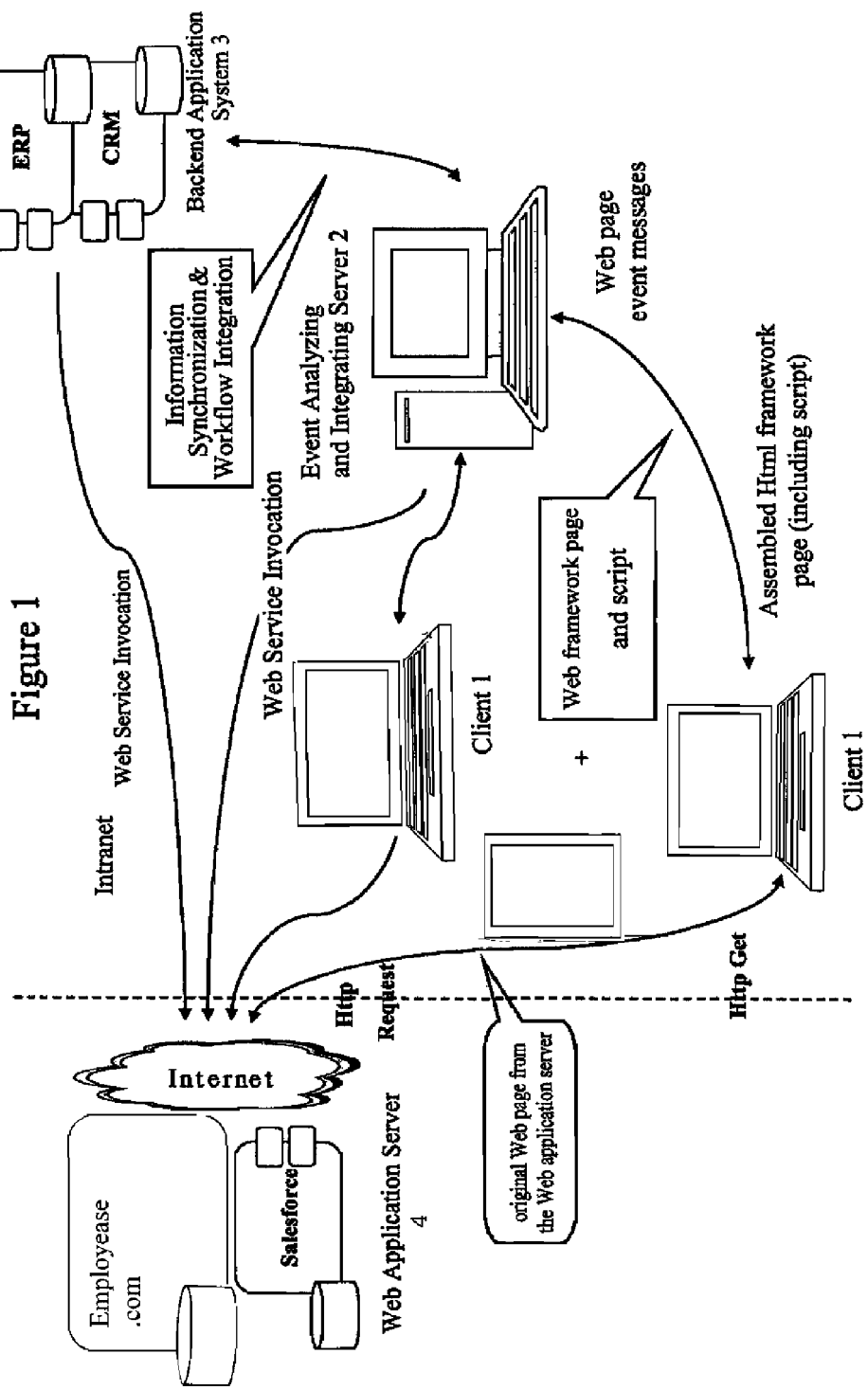
FIG. 1 illustrates a computer network environment in which a preferred embodiment according to one aspect of the present invention may be applied.
Figure 2:
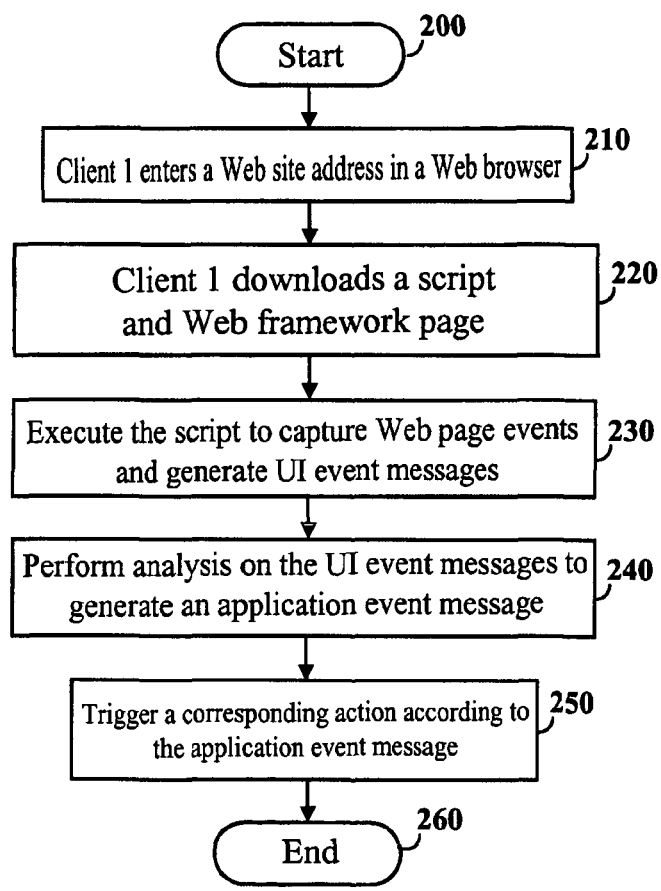
FIG. 2 illustrates a flowchart of a method for capturing and analyzing Web page events of a client so as to accomplish Web application integration in the computer network environment as shown in FIG. 1 according to one embodiment of the present invention.
Figure 3:
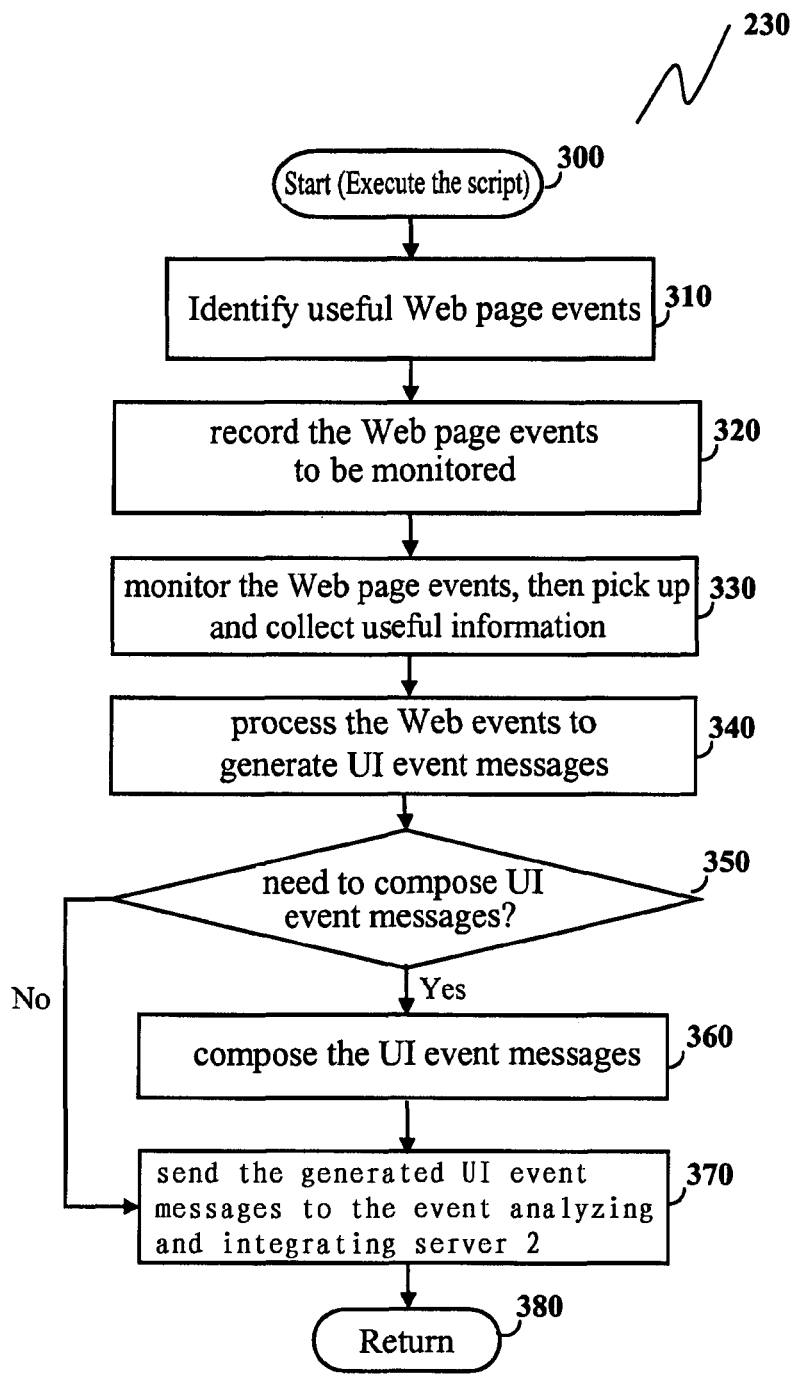
FIG. 3 illustrates a flowchart of a detailed process of how to capture Web page events of a client to generate User Interface (UI) event messages (i.e., step 230 of FIG. 2) according to one embodiment of the present invention.
Figure 4:
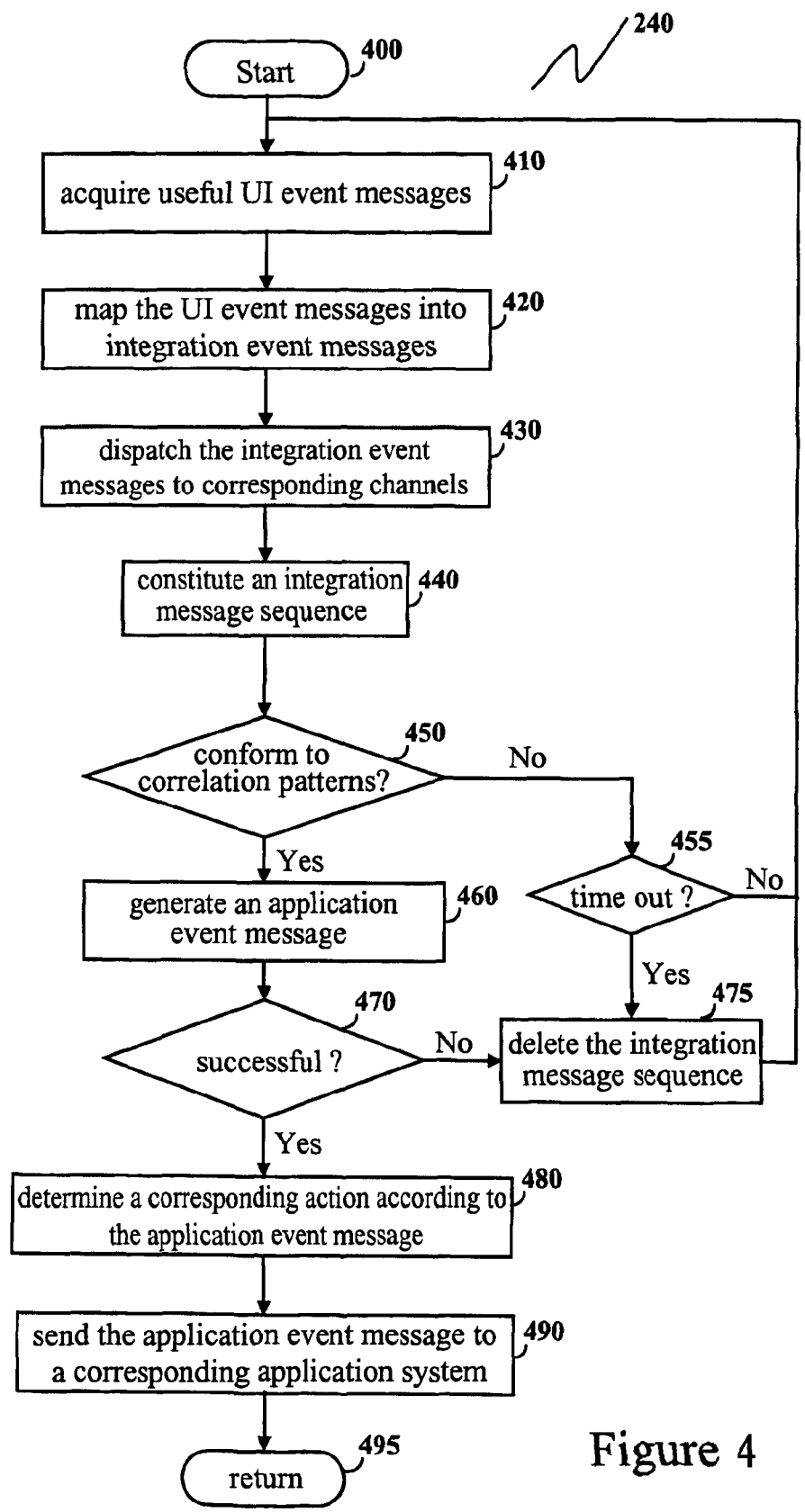
FIG. 4 illustrates a flowchart of a detailed process of how to map UI event messages into integration event messages and then obtain an application event message by an event analyzing and integrating server 2 as shown in FIG. 1 (i.e., step 240 of FIG. 2) according to an embodiment of the present invention.
Figure 9:
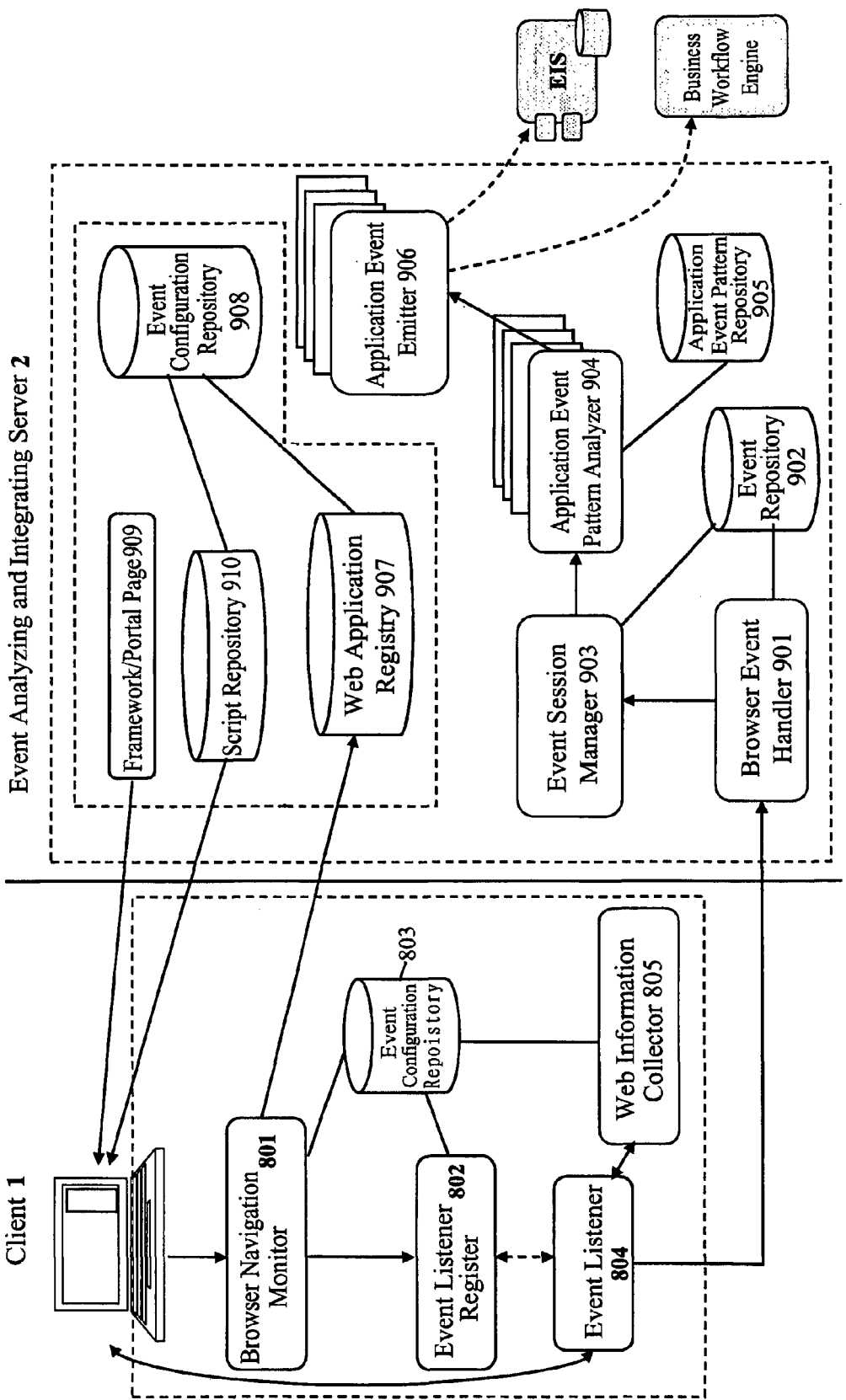
Figure 10:
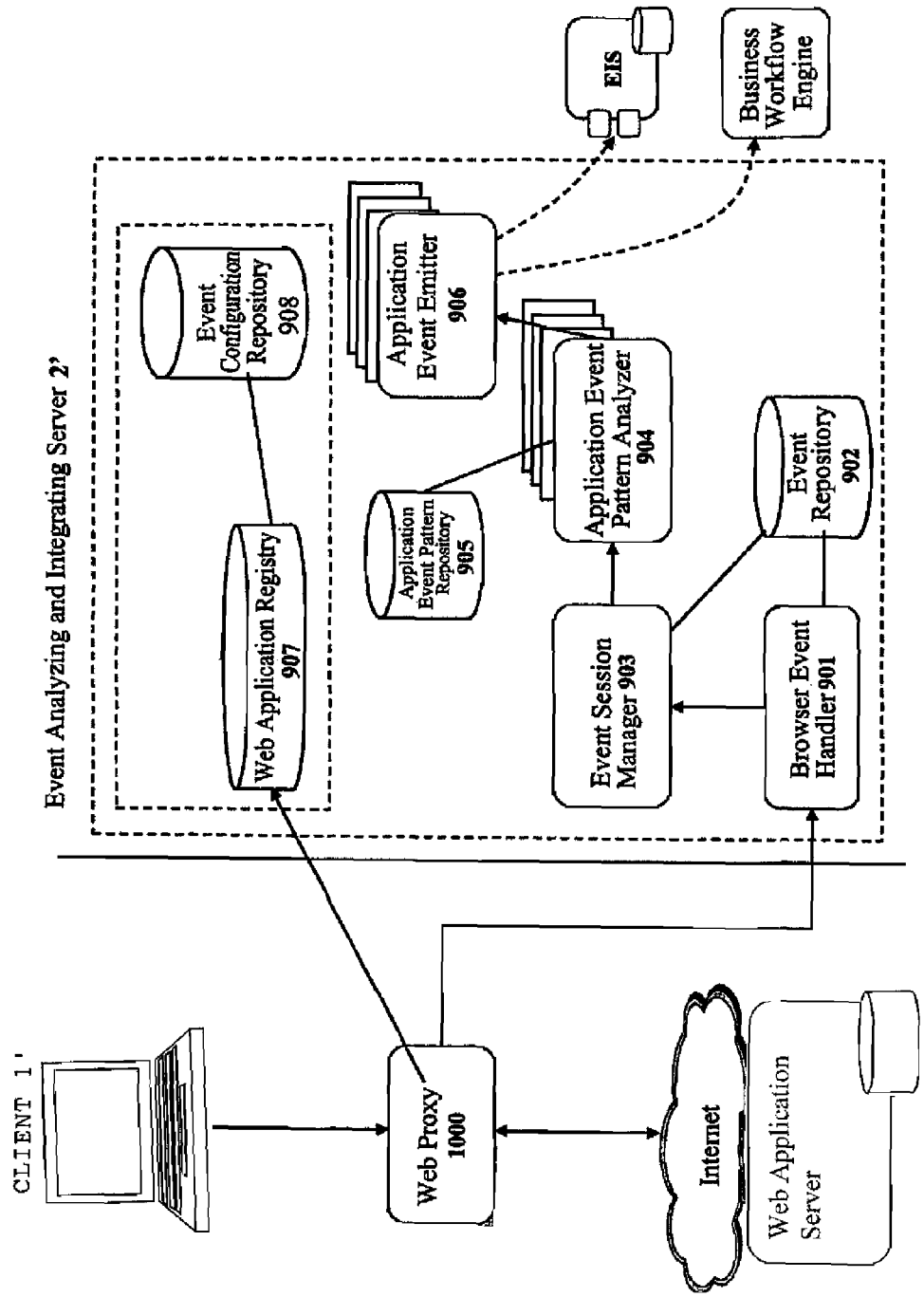

FIG. 9 illustrates the main structure of a client 1 and an event analyzing and integrating server 2 for implementing the method as shown in FIGS. 2-4 in the computer network environment as shown in FIG. 1 according to an embodiment of the present invention; and FIG. 10 illustrates a system for capturing and analyzing the Web page event messages of the client and then performing the Web application integration, and the main structure of an event analyzing and integrating server according to another embodiment of the present invention.

Those skilled in the art will appreciate that elements in the drawings are illustrated only for simplicity and clarity and have not necessarily been drawn to scale. For example, the dimensions of some of the elements in the drawings may be enlarged relative to other elements to help to improve understanding of the embodiments of the present invention.

DETAILED DESCRIPTION OF THE INVENTION

Exemplary embodiments of the present invention will be described in conjunction with the accompanying drawings hereinafter. For the purpose of clarity and conciseness, not all the features of actual implementations are described in the specification. However, it is to be appreciated that during developing any of such actual implementations, numerous implementation-specific decisions must be made to achieve the developer's specific goals, for example, compliance with system-related and business-related constraints which will vary from one implementation to another. Moreover, it is to be appreciated that such a development effort might be complex and time-consuming, but may nevertheless be a routine task for those skilled in the art having the benefit of this disclosure.

Furthermore, it is noted herein that, in order to avoid obscuring the present invention due to unnecessary details, the drawings only show device configures and/or processing steps closely related to the solutions according to the present invention and other details little related to the present invention are omitted.

FIG. 1 illustrates a computer network environment in which a preferred embodiment according to one aspect of the present invention may be applied.

As shown in FIG. 1, depending on the actual circumstances, the Intranet typically includes one or more clients 1, an event analyzing and integrating server 2 (also referred to as "a middleware system"), and one or more backend application systems 3, which may be various kinds of application systems such as the Enterprise Resource Plan (ERP), Customer Relationship Management (CRM), Support Chain Management (SCM), Office Automation (OA), Enterprise Information System (EIS) and so on.

The clients 1 can access multiple external Web application servers (also referred to as Web servers) distributed across the world via the Internet. For the purpose of simplicity, there are only two clients 1, two Web application servers 4 and two backend application systems, i.e., ERP and CRM shown in FIG. 1. For example, as shown in FIG. 1, the client 1 may access websites such as Employease and Salesforce via HTTP requests through the Internet, and get original Web pages of the Web application servers via HTTP Get operations.

When the client 1 accesses the Web application server 4 for the first time, the client 1 sends Web page event messages to the event analyzing and integrating server 2, and downloads a Web framework page and predetermined script from the event analyzing and integrating server 2. Then, the downloaded script is executed on the client, and the downloaded Web framework page and an original Web page received from the Web application server are assembled, thereby displaying an assembled HTML framework page containing the script on a display of the client. The predetermined script is pre-designed and stored in the event analyzing and integrating server 2 as required.

The event analyzing and integrating server 2 can further perform information synchronization and/or workflow integration with the one or more backend application systems 3.

The processes of the client 1, the event analyzing and integrating server 2 and the backend application system 3 and the relationships therebetween will be described in detail with reference to the flowcharts as shown in FIGS. 2-4.

FIG. 2 illustrates a flowchart of a method for capturing and analyzing Web page events of the client 1 so as to accomplish Web application integration in the computer network environment as shown in FIG. 1 according to an aspect of the present invention.

As shown in FIG. 2, this method begins with step 200. Then, at step 210, a user of the client 1 (also referred to as an end user) enters a URL address such as the address for Employease on the Web browser, so as to access a corresponding Web application server 4 or website via the Internet and receive an original Web page from the corresponding Web application server or website.

Then, at step 220, the client 1 determines if a target Web page to be accessed has been registered as Web pages required to be monitored in the event analyzing and integrating server 2. If so, a Web framework page and a script for capturing Web page events of the client are downloaded from the event analyzing and integrating server 2, without requiring user knowledge of the download activity.

Herein, this script can be in a script language such as Java Script compliant with the Microsoft or W3C standard, or VB Script compliant with the Microsoft standard. Of course, other script languages are also possible.

The script for capturing the Web page events of the client contains event configuration information which indicates to the client what information needs to be recorded and monitored in order to capture and monitor the Web page events. For example, such information to be recorded and monitored may contain document object models (DOMs), mouse events, key pressing events, form events and other related information.

The right half part of FIG. 5 shows an exemplary segment of a script language for capturing the Web page events of the client.

After receiving the script and Web framework page from the event analyzing and integrating server 2, at step 230, an assembled HTML framework page obtained by assembling the Web framework page and said original target Web page is displayed on the client 1, and the script is executed so as to capture the Web page event messages of the client 1 and generate Web browser based UI event messages.

The detailed process of step 230 will be described in detail hereinafter with reference to FIG. 3.

It is noted herein that, said script and Web framework page are downloaded from the event analyzing and integrating server 2 when the client 1 accesses the Web application server 4 for the first time, and then are stored in a memory of the client. When the client accesses the Web application server next time, the client may directly fetch the previously downloaded script and Web framework page from the memory.

FIG. 3 shows a flowchart of a detailed process of how to capture Web page events of a client to generate UI event messages, that is, a detailed process of step 230 in FIG. 2, according to one embodiment of the present invention.

As shown in FIG. 3, the process of step 230 begins with step 300, where the script downloaded from the event analyzing and integrating server 2 is executed on the client 1.

Then, at step 310, all useful Web page events such as "clicking" etc. in multiple forms included in the target Web page are identified according to the event configuration information downloaded from the event analyzing and integrating server 2.

Herein, the type of the Web page events is compliant with the Microsoft and W3C DOM event standards so that the events can be registered in a separate form without code injection into the original Web pages of the server.

At step 320, all the Web page events required to be monitored are recorded.

Subsequently, at step 330, the Web page events as monitoring targets are monitored, and some useful information, such as DOM-OBJ values and the like, is picked up and collected therefrom, so as to obtain Web page event messages.

Then, at step 340, a Web event process is performed according to the useful information collected at step 330. Specifically, the captured Web page event messages are processed (for example, packaged and/or mapped) to generate UI event messages.

The left half part of FIG. 5 shows a typical HTML event handling model, with a capturing phase (1), a target phase (2) and a bubbling phase (3), while the right half part thereof shows some basic HTML event types.

Figure 6:
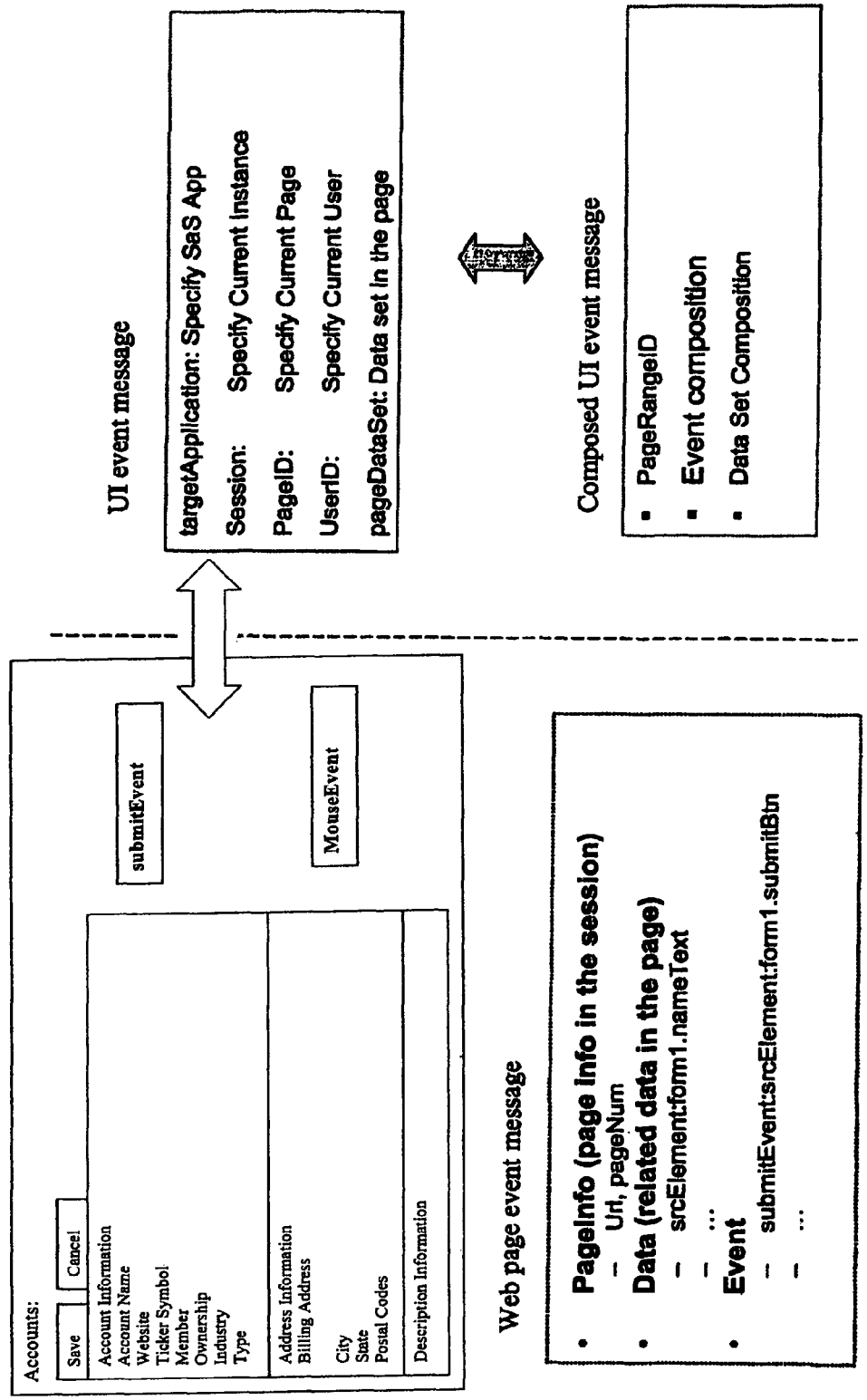
FIG. 6 illustrates an exemplary Web page, and the format of the used Web page event messages, UI event messages and composed UI event messages according to one embodiment of the present invention.

FIG. 6 illustrates an exemplary Web page, and the format of the Web page event messages and UI event messages.

As shown in FIG. 6, taking a general Web page as an example, the page requested by the user may comprise the following information: information of the page itself—URL and corresponding parameters, page session information, and business data information. The mapping relationships with the UI event messages are as follows: selective business data (pageDataSet) is originated from the business data information in the Web page, the name of the Web application (targetApplication) is originated from the URL, the Session information is originated from the Page SessionID (which is optional), the current page ID information is originated from the page content self or URL (which is optional), and the user ID is originated from the session related information (which is optional).

The bottom right part of FIG. 6 further shows the format of composed UI event messages, which are applicable to these cases described below. For example, before the client user submits a Web page form, such a case where the Web page form is too long to be displayed in one page may occur, at this time, the user needs to turn the page over so as to continue filling the form in a next page. In such cases, it is needed to compose the generated multiple Web page messages.

In consideration of the above mentioned cases, as shown in FIG. 3, at step 350, it is decided whether the generated UI event messages need to be composed or not.

If it is decided that the composition is needed at step 350, then the process proceeds to step 360, where the generated multiple UI event messages are composed to generate composed UI event messages. Then, the process proceeds to step 370.

If it is decided that the composition is not needed at step 350, then the process proceeds to step 370.

When the target Web page is refreshed or submitted to the Web application server, at step 370, the generated UI event messages (or the composed UI event messages) are sent by the client 1 to the event analyzing and integrating server 2.

Then, the process as shown in FIG. 3 returns at step 380, thereby ending the process of step 230 in FIG. 2.

Now referring back to FIG. 2, after step 230, that is, after the event analyzing and integrating server 2 has received the UI event messages (or the composed UI event messages) from the client, at step 240, the UI event messages (or the composed UI event messages) are analyzed (i.e., mapped into integration event messages) to generate an application event message according to predefined rules or business processing rules.

The process of step 240 will be described in detail thereinafter in connection with a flowchart of FIG. 4.

FIG. 4 shows a flowchart of a detailed process of how to analyze the UI event messages (that is, how to map them into integration event messages) and then obtain an application event message by the event analyzing and integrating server 2 (that is, step 240 of FIG. 2) according to an embodiment of the present invention.

As shown in FIG. 4, the process of step 240 begins with step 400.

Then, at step 410, the event analyzing and integrating server 2 receives (acquires) useful UI event messages (or composed UI event messages) from the client 1.

Next, the process proceeds to step 420, where the event analyzing and integrating server 2 maps the received UI event messages (or the composed UI event messages) into integration event messages according to the predefined mapping relationships between the UI event messages and the integration event messages, and concurrently inherits useful information from the Web page events.

Figure 7:
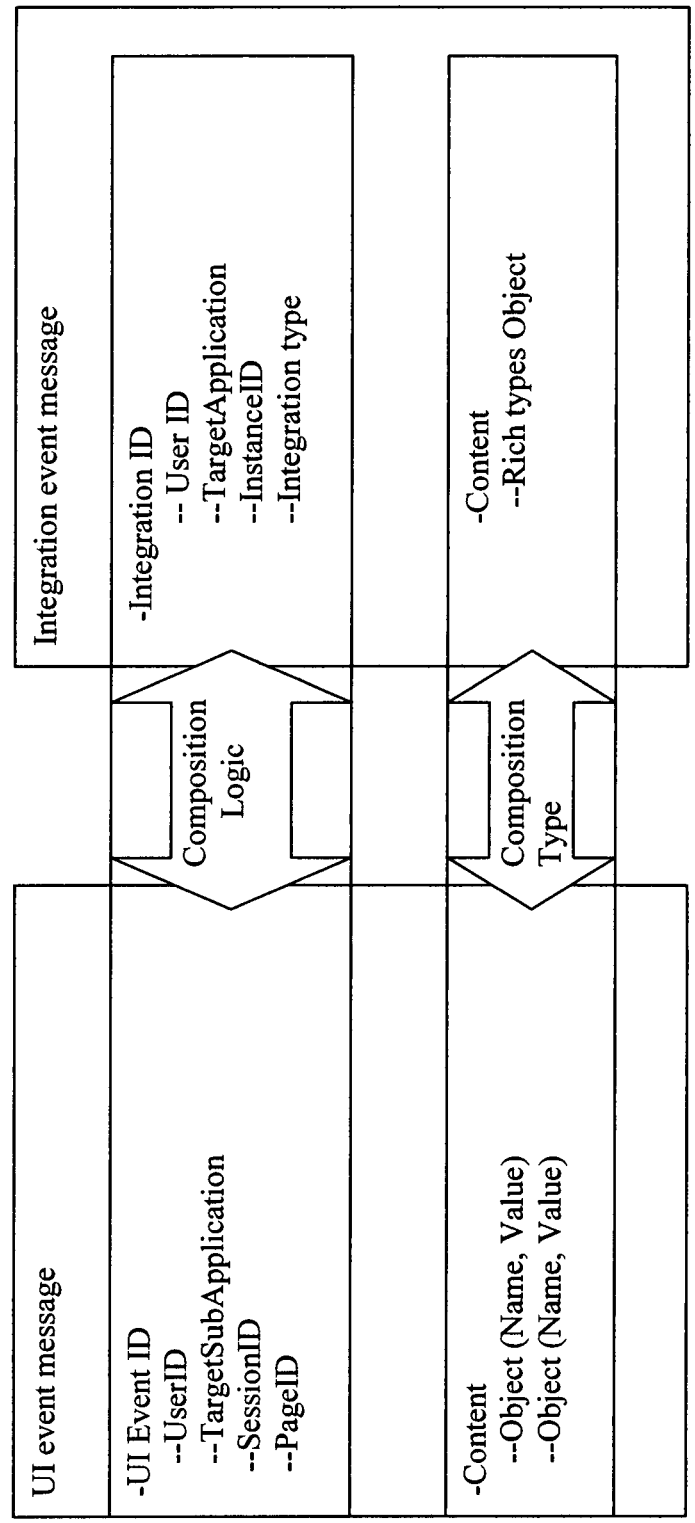
FIG. 7 illustrates mapping relationships between the UI event messages and the integration event messages according to an embodiment of the present invention.

The mapping relationships between UI event messages and integration event messages according to one embodiment of the present invention are shown in FIG. 7.

In the process of mapping the UI event messages into the integration event messages as shown in FIG. 7, at first, information such as User IDs, Session IDs, etc. is retrieved from the ID information of the UI event to maintain the context information of the Web events, and information related to the Web applications to which the events belong is also retrieved to determine a processing channel. In addition, data of a simple type transmitted in the Web UI events can be converted into data of a complex type required by the integration when necessary (optional).

Then, at step 430, the event analyzing and integrating server 2 obtains the integration event messages by the mapping process, and determines the sessions to which the integration event messages belong according to the SessionIDs (session IDs) in the UI event messages, so as to dispatch the integration event messages to related channels corresponding to the sessions.

For illustrating the present invention more clearly and simply, it is assumed herein that one session corresponds to one channel, and the process within one channel will be taken as an example and described below. Obviously, it is possible that one channel corresponds to multiple channels.

The process then proceeds to step 440, where the integration event messages from the same user (or client) in each channel constitute (or establish) one integration event message sequence.

Then, at step 450, it is determined whether the integration event message sequence conforms to predefined correlation patterns (also referred to as application event patterns) among the integration event messages.

For example, if it is assumed that the successful submission of three Web page events can trigger one application event, then the failure of any of these Web page events will cause no application event message to be generated, thus cause the failure of the user action.

As for the correlation patterns among the integration event messages, the further description thereof will be given with reference to FIG. 8 by means of an example.

FIG. 8 illustrates three Web pages used by the user to submit messages to generate one application event message (i.e. trigger one application event), which correspond to an exemplary correlation pattern according to one embodiment of the present invention.

How to analyze the correlation patterns of the integration event messages will be explained by taking the actions of logging in an external CRM system and creating a contract by a terminal user as an example.

It is assumed that the actions of creating a contract on the external CRM system by the terminal user involve the submission of three Web pages as shown in FIG. 8. Other business actions of the backend application systems (for example, the ERP system) inside the enterprise can be triggered only when the submission events of the three Web pages have occurred in sequence.

Herein, three Web page submission operations (or Web page submission event messages) occurred sequentially in the same session from the same user may constitute one kind of correlation patterns of the integration event messages.

In the case of defining the correlation pattern as shown in the FIG. 8, three Web page submission events will be recorded in the client, and after the event processing of these Web page event messages is performed as described above, three UI event messages will be generated sequentially. Then, after the three UI event messages have been received, the event analyzing and integrating server 2 maps them into integration event messages and records them. Only when the above three integration event messages from the same user in the same session have been received by the event analyzing and integrating server 2 sequentially, that is, only when these integration event messages from the same user in the same session conform to the predefined correlation pattern, will the event analyzing and integrating server 2 generate one application event message to trigger a corresponding business behavior or action.

Below, refer back to FIG. 4 again.

If it is determined at step 450 that said integration event message sequence (that is, the integration event messages from the same user (or client) in the channel) conforms to the correlation patterns, then at step 460, an application event message is generated.

In the present invention, corresponding identifications and useful information can be used to predefine and structuralize the application event message.

If it is determined at step 450 that the integration event message sequence does not conform to the correlation patterns, then the process proceeds to step 455, where it is determined whether the system has timed out or not.

If it is determined at step 455 that the system has not timed out, then the process goes back to step 410 so as to receive further UI event messages (or composed UI event messages) from the client.

If it is determined at step 455 that the system has timed out, then the process proceeds to step 475.

After step 460, the process proceeds to step 470, where it is determined whether the application event message has been generated successfully or not.

If it is determined at step 470 that the application event message cannot be generated successfully, then the process proceeds to step 475.

Herein, the application event message cannot be generated successfully due to a plurality of possible reasons. For example, in the case as shown in FIG. 8, only when the integration messages corresponding to the sequential submission event messages of the three Web pages from the same user have constituted a complete integration message sequence in the event analyzing and integrating server, will the application event message be generated successfully. Otherwise, if any of the Web page submission events fails or times out, then the application event message cannot be generated successfully. Of course, there may be other reasons causing no application event message to be generated successfully.

At step 475, the integration message sequence is deleted (or cleared). Then, the process goes back to step 410, so as to receive further UI event messages (or composed UI event messages) from the client, and repeats the steps described above.

If it is determined at step 470 that the application event message has been generated successfully, then the process proceeds to step 480, where a corresponding action next to be taken is determined based on the application event message.

Then, at step 490, the application event message is dispatched to one or more corresponding backend application systems such as the Enterprise Information System (EIS), Customer Relation Management (CRM) system, Enterprise Resource Planner (ERP) system or other systems based on the determined corresponding action.

Thereafter, the process as shown in FIG. 4 (that is, step 240 in FIG. 2) goes back to the process as shown in FIG. 2 at step 495.

Refer back to FIG. 2 again. After step 240, the process proceeds to step 250, where the corresponding action is triggered in the one or more corresponding backend application systems based on the application event message.

Then, the process as shown in FIG. 2 ends at step 260.

A method for capturing and analyzing the Web page events of the client and then accomplishing the Web application integration according to one embodiment of the present invention has been described above in connection with FIGS. 1 to 8. However, it will be understood by those skilled in the art that, some steps or contents, such as the HTML event handling model and script as shown in FIG. 5, the format of the Web page messages, the UI event messages and the composed UI event messages as shown in FIG. 6, the mapping relationships between the UI event messages and the integration event messages as shown in FIG. 7, and the correlation patterns of the integration event messages described in connection with FIG. 8, are merely exemplary. Those skilled in the art can readily make various modifications to the script design, message format, mapping relationships, and the correlation patterns of the integration event messages depending upon the actual circumstance and requirements.

FIG. 9 illustrates the main structure of the client 1 and the event analyzing and integrating server 2 for implementing the method as shown in FIGS. 2-4 in the computer network environment as shown in FIG. 1 according to an embodiment of the present invention.

It is noted herein that, only those parts closely related to the present invention in the client 1 and the event analyzing and integrating server 2 are shown in FIG. 9, and connecting lines and arrows between the units or devices represent signal transmission relationships therebetween.

As shown in FIG. 9, the event analyzing and integrating server 2 comprises a browser event handler 901, an event repository 902, an event session manager 903, one or more application event pattern analyzers 904, an application event pattern repository 905, one or more application event emitters 906, a Web application registry 907, an event configuration repository 908, a framework/portal page 909 and a script repository 910.

As described above with reference to FIGS. 1 and 2, when a client connects to an external Web application server via the Internet for the first time, a Web framework page and script will be downloaded from the framework/portal page 909 and script repository 910 of the event analyzing and integrating server 2, respectively.

After the Web framework page and script have been downloaded, the client will assemble an original Web page from the external Web application server and the Web framework page, thus an assembled HTML framework page obtained by the assembling is displayed on a display of the client, and the downloaded script is executed.

After executing the script, a browser navigation monitor 801, an event listener register 802, an event configuration repository 803, an event listener 804 and a Web information collector 805 will be generated in the client 1.

It is apparent that the event configuration repository 803 in the client 1 and the event configuration repository 908 in the event analyzing and integrating server 2 are related.

The browser navigation monitor 801 is responsible for monitoring whether or not a target Web page to be accessed by the client user belongs to Web pages required to be monitored which have been registered in the Web application registry 907 of the event analyzing and integrating server 2.

The event configuration repository 803 contains event configuration information for indicating what information is required to be recorded and monitored in order to capture and monitor Web page events, such as keyboard events, mouse events, etc.

In addition, if it is determined that the target Web page to be accessed has been registered in the Web application registry 908, then the browser navigation monitor 801 determines what useful information of the Web page events is required to be recorded and monitored based on the event configuration information contained in the event configuration repository 803, and records the Web page events required to be recorded and monitored and the useful information thereof on the event listener register 802.

The event listener 804 captures and monitors (or listens) the Web page event messages of the client according to the determined Web page events required to be monitored and the useful information thereof. The Web information collector 805 picks up and collects the useful information, such as DOM-OBJ values and etc. from the Web page events captured by the event listener 804, and provides the collected useful information to the event listener 804.

The event listener 804 processes useful Web events, that is, processes (for example, packages and/or maps) the captured Web page event messages to generate UI event messages based on the useful information collected by the Web information collector 805. In addition, the UI event messages can be composed by the event listener 804 to generate composed UI event messages when necessary. After the UI event messages or the composed UI event messages have been generated, the event listener 804 sends the generated messages to the browser event handler 901 of the event analyzing and integrating server 2.

After receiving the UI event messages (or the composed UI event messages) from the client 1, the browser event handler 901 maps the messages to generate integration event messages according to predefined mapping relationships between the UI event messages and the integration messages stored in the event repository 902, and obtains necessary useful information, such as SessionIDs and etc. from the UI event messages.

Then, the browser event handler 901 provides the generated integration event messages and the necessary information such as the SessionIDs obtained from the UI event messages to the event session manager 903.

The event session manager 903 determines which session the received UI event messages (or the composed UI event messages) belong to based on the obtained necessary information such as SessionIDs etc., and dispatches the generated integration event messages to different corresponding channels depending on the determined sessions, and then sends them to the corresponding application event pattern analyzers 904 within the corresponding channels, respectively.

For illustrating the principles of the present invention clearly and briefly, it is assumed herein that one session corresponds to one channel and there is one application event pattern analyzer 904 and one application event emitter 906 within each channel. However, it is also possible that one session corresponds to multiple channels and multiple channels share one application event pattern analyzer 904 and one application event emitter 906.

The application event pattern analyzer 904 analyzes the received multiple integration event messages based on the predefined application event patterns (i.e., the correlation patterns among the integration events) in the application event pattern repository 905, to determine whether they conform to the predefined correlation patterns or not, and if the multiple integration event messages conform to the predefined correlation patterns, then an application event message is generated, and a corresponding action to be triggered thereby is determined.

Then, the application event emitter 906 sends the application event message to corresponding backend application systems, such as the EIS system or a business workflow engine, to trigger the corresponding subsequent action based on the determined corresponding action to be triggered.

Although the method and system for capturing and analyzing the Web page events of the client to integrate the Web applications, and the structure of the client 1 and the event analyzing and integrating server 2 included in the system according to one aspect of the present invention have been described above with reference to FIGS. 1-9, it is obvious to make various modifications to them so as to get various variants in lie of the principles and teachings disclosed above.

For example, although it has been described that those units or modules included in the client 1 are generated by downloading the script from the event analyzing and integrating server 2 and executing the downloaded script (that is, the above mentioned units or modules included in the client are implemented by computer software), it will be appreciated by those skilled in the art after reading the above description that the units or modules included in the client 1 can also be separately implemented by computer hardware or firmware, or any combination of the computer software, hardware and firmware.

Furthermore, it will be understood by those skilled in the art that those units or modules included in the event analyzing and integrating server 2 can also be separately implemented by the computer software, hardware, or firmware, or any combination thereof.

In addition, although the framework/portal page 909, the script repository 910, the Web application registry 907, the event configuration repository 908 have been described above as being included in the event analyzing and integrating server 2, it is possible that these information or data repositories are not included in the event analyzing and integrating server 2, but stored in an individual memory or storage device separate from the event analyzing and integrating server 2, as long as the event analyzing and integrating server 2 can access the individual memory or storage device to get corresponding information and provide them to the client.

In addition, it is also possible to make other modifications to the embodiments described above. For example, although it has been described above that the function (or processing step) of mapping the UI event messages (or the composed UI event messages) from the client to obtain the integration event messages is implemented or carried out by the browser event handler 901, this function (or processing step) can also be implemented or carried out by the event session manager 903.

For the sake of conciseness of the specification, various possible modifications or variants of the embodiments are not described one by one herein.

FIG. 10 illustrates a system for capturing and analyzing Web page event messages of a client and then integrating Web applications, and the main structure of an event analyzing and integrating server 2' according to another embodiment of the present invention.

A proxy mechanism has been used in this embodiment. Therefore, in this embodiment, the process at the client side is slightly different from the embodiments described above in connection with FIGS. 1-9, but the process at the event analyzing and integrating server side is substantially the same.

The system as shown in FIG. 10 can perform a process similar to the method described above in connection with FIGS. 2-4, that is, the system can implement a method for capturing and analyzing Web events of a client and then integrating Web applications to trigger a corresponding action.

As shown in FIG. 10, a Web proxy (also referred to as a proxy server) 1000 is added between a client 1' and an event analyzing and integrating server 2'.

Different from the previous embodiments, Web page event messages of the client are captured by the proxy server 1000 rather than the client itself, and UI event messages (or composed UI event messages) generated by the proxy server 1000 are provided to the event analyzing and integrating server 2'. Of course, in this case, a browser of the client 1' needs to be preconfigured to access the Internet via the proxy.

Herein, similar to the previous embodiments, the proxy server 1000 can also include a browser navigator monitor, an event listener register, an event configuration repository, an event listener, and a Web information collector, and the functions implemented by them are also substantially the same as those of the corresponding units in the previous embodiments.

However, it is be noted that, in the present embodiment, different from the previous embodiments, the browser navigator monitor, the event listener register, the event configuration repository, the event listener, and the Web information collector are not generated by downloading the script from the event analyzing and integrating server 2'. Of course, they can be separately implemented by the computer software, hardware, and firmware, and any combination thereof. When being implemented by the computer software, they can be implemented by other programming languages, which is quite different from the previous embodiments in which only the script language can be used.

Besides this, it can be seen from the comparison between FIG. 9 and FIG. 10 that the structure of the event analyzing and integrating server 2' of the present embodiment and that of the event analyzing and integrating server 2 of the previous embodiments are substantially the same, and the difference between them only lies in that, the framework/portal page 909 and the script repository 910 as shown in FIG. 9 are not included in the present embodiment. This is because the client 1' or the proxy server 1000 does not need to download the Web framework page and script from the event analyzing and integrating server in the present embodiment, thus the event analyzing and integrating server 2' does not need to include the framework/portal page 909 and script repository 910.

Compared with the previous embodiments, in this embodiment, when capturing and analyzing the Web events of the client, the proxy server can get the Web page event messages of the client only after the Web pages have been submitted by the client, whereas in the previous embodiments, the Web page event messages are captured at the client side, thus the Web event messages can be recorded and captured in real time. In addition, the UI events are not required in this embodiment. Therefore, the client can be significantly simplified compared with the previous embodiments. In this embodiment, each submission operation will be forwarded to the "event analyzing and integrating server" via the proxy server.

As described above, similar to the embodiments described in connection with FIGS. 1-9, the embodiment as illustrated in FIG. 10 can be modified in various ways. In addition to those possible modifications described above, it is possible to make other modifications to this embodiment. For example, although the proxy server 1000 and the event analyzing and integrating server 2' have been described as two servers separate from each other, it is obvious that they can be implemented by the same one server.

For the sake of conciseness of the specification herein, the further description of the method implemented and performed by the system as shown in FIG. 10 is omitted, nor is the flowchart of this method shown here. However, the flowchart of this method is similar to those as shown in FIGS. 2-4. It is very easy for those skilled in the art to draw the flowchart of this method without any creative work after reading the simple literal description of the system and method for capturing and analyzing Web event messages and then performing Web application integration as described above.

Although the applications of one aspect of the present invention, that is, examples of the present invention in the Web application integration processes have been described with reference to FIGS. 1-10, the applications of this aspect are just exemplary, it does not mean that the present invention is limited to this application field. It is apparent for those skilled in the art that the present invention can also be applied to other aspects from the description of the present invention hereinbefore. For example, the present invention can be applied in the Intranet to monitor the Internet access action of the client. The enterprise can set Internet Website accessing rules to monitor the employee's action. Each employee's action that violates the rules will trigger a corresponding event to inform an administrator in charge. Of course, the present can also be applied to any other cases in which Web event monitoring and event mode analyzing are needed.

Furthermore, each operation procedure according to the methods of the present invention described above can also be implemented in the form of a computer executable program stored in various machine readable storage media.

Moreover, the objects of the present invention can also be implemented by providing a storage medium with codes of the above executable program stored thereon directly or indirectly to a system or device, and then reading and executing the program codes by a computer or center processing unit (CPU) of the system or device.

At this time, so long as the system or device has the function of executing the program, the implementing modes of the present invention are not limited to the program, and the program can be in any form of, for example, an object program, a program performed by an interpreter, or script program provided to an operating system etc.

The machine readable storage media mentioned above may include but not be limited to various memories and storage units, semiconductor devices, magnetic disk units such as optical, magnetic and magneto-optic disks, and other media suitable for storing information.

In addition, the present invention may be achieved by a client computer by connecting to corresponding websites on the Internet, downloading the computer program codes according to the present invention and installing the same into the computer and then executing the program.

It is also note that, in this document, relational terms such as left and right, first and second, or the like are used solely to distinguish one entity or action from another entity or action without necessarily requiring or implying any actual such relationship or order between such entities or actions. Moreover, the terms "comprise", "comprising," "include" or any other variations thereof, are intended to cover a non-exclusive inclusion so that a process, method, article, or apparatus that comprises a list of elements does not only include those elements but also may include other elements not expressly listed or inherent to such process, method, article, or apparatus. An element preceded by "a" or "an" does not, without more constraints, preclude the existence of additional identical elements in the process, method, article, or apparatus that comprises the element.

Although the embodiments of the present invention have been described in detail with reference to the accompanying drawings, these embodiments are only used to illustrate the present invention and not to limit the present invention. Various modifications and changes can be made by those skilled in the art without departing from the spirit and scope of the present invention. Therefore, the scope of the present invention is only defined by the appended claims and the equivalents thereof.

What is claimed:

1. A method for performing Web event analysis of user interface event messages from a client to generate a Web application event message, comprising steps performed at a server of:
   obtaining event configuration information indicating Web pages at which selected user interface event messages are to be monitored in response to a client request to access one of said Web pages;
   sending a predetermined capture script for download at said client;
   receiving selected user interface event messages based on execution of the predetermined capture script at the client;
   processing the received user interface event messages to generate integration event messages;
   identifying correlation patterns among integration event messages, wherein correlation patterns relate to at least one of an enterprise business regulation and an enterprise business processing rule;
   determining to which sessions the received user interface event messages belong;
   dispatching the integration event messages to different corresponding channels depending on the different sessions to which the received user interface event messages belong;
   analyzing the integration event messages to determine whether the messages conform to at least one predefined correlation pattern;
   when messages conform to at least one predefined correlation pattern, determining a corresponding action to be triggered in at least one different enterprise application;
   generating a Web application event message within each channel according to correlation patterns among the integration event messages, and
   transmitting the Web application event message to at least one different enterprise application to trigger the corresponding action,
   wherein at least one of the steps is carried out by a computer device.

2. The method according to claim 1 wherein said method further comprises a step of deleting said integration message sequence based on at least one of elapsed time and an instance when the corresponding application event message cannot be generated successfully.

3. The method according to claim 1,
   wherein said received user interface event messages are composed user interface event messages,
   wherein the step of processing the received user interface event messages to generate the integration event messages further comprises a step of mapping the composed user interface event messages into the integration event messages, and
   wherein mapping relationships between the user interface event messages and the integration event messages, and the correlation patterns among the integration event messages are all predefined.

4. A server apparatus for performing Web event analysis of user interface event messages from a client to generate a Web application event message, comprising:

at least one computing device for executing components;

an event repository storing mapping relationships between the user interface event messages and integration event messages and event configuration information indicating Web pages at which selected user interface event messages which are to be monitored;

a script repository for storing and sending a predetermined capture script to a client in response to a client request to access one of said Web pages;

a browser event handler component for receiving selected user interface event messages based on execution of the predetermined capture script at the client, processing the received user interface event messages to generate the integration event messages according to mapping relationships stored in the event repository, and obtaining necessary information from the user interface event messages;

an event session manager component for determining which sessions the received user interface event messages belong to according to the information obtained by the browser event handler component, and dispatching the integration event messages to different corresponding channels depending on the different sessions to which the user interface event messages belong;

an application event pattern repository for storing correlation patterns among the integration event messages, wherein correlation patterns relate to at least one of a business regulation and a business processing rule;

one or more application event pattern analyzer components for identifying correlation patterns among integration event messages and generating a Web application event message within each channel according to the correlation patterns among the integration event messages, wherein each of said one of more application event pattern analyzer components includes a memory for storing an integration event message sequence; and wherein identifying correlation patterns comprises determining whether said integration event message sequence conforms to the correlation patterns among the integration event messages stored in the application event pattern repository, and, if it is determined that said integration event message sequence conforms to the correlation patterns, generating at least one of a user interface event message and an Web application event message based on the correlation patterns; and one or more application event emitter components for dispatching at least one Web application event message to at least one different enterprise application to trigger the corresponding action.

5. The apparatus according to claim 4,
   wherein said received user interface event messages are composed user interface event messages; and
   wherein the mapping relationships between the user interface event messages and the integration event messages, and the correlation patterns among the integration event messages are all predefined, and stored in the event repository and the application event pattern repository, respectively.

6. A computer-implemented method for capturing Web page events of a client in a computer network, comprises steps performed at one of a client and a client proxy of:

obtaining event configuration information indicating Web pages at which selected user interface event messages which are to be monitored comprising downloading a predetermined capture script in response to the client's access to a Web application server through the Internet;

executing the predetermined capture script for recording and monitoring Web page events as monitoring targets among the Web page events of the client based on the event configuration information, and picking up and collecting information therefrom and capturing Web page event messages of the client and performing a Web event process to generate at least one of user interface event messages and at least one Web application event message based on correlation patterns in said Web page event messages, wherein correlation patterns relate to at least one of a business regulation and a business processing rule, and dispatching the at least one user interface event message and at least one Web application event message so as to trigger a corresponding action, wherein at least one of the steps is carried out by a computer device.

7. The method according to claim 6, wherein the step of capturing the Web page event messages of the client and performing the Web event process to generate the user interface event messages further comprises a step of:

mapping the Web page event messages of the client to generate the user interface event messages according to predefined mapping relationships between the Web page event messages and the user interface event messages.

8. The method according to claim 6,
   wherein said script is a Java Script or VB Script, and
   wherein said method further comprises steps of:
      downloading a Web framework page from the server;
      assembling an original Web page from said Web application server and said downloaded Web framework page to generate an assembled HTML framework page; and
      displaying the assembled HTML framework page on the client.

9. The method according to claim 6, wherein said method is executed on a proxy server, and the client is set to access the Internet via the proxy server.

10. The method according to claim 6,
    wherein which Web page events of the client needed to be monitored and which information to be picked up and collected are preset, and said information includes session IDs, and
    wherein said method further comprises steps of:
       determining whether the user interface event messages need to be composed or not; and
       if it is determined that the composition is needed, composing user interface event messages.

11. A client apparatus for capturing Web page events of a client in a computer network, comprising:

at least one processor for executing components;

a script repository for storing a predetermined capture script downloaded in response to a request by a user of the client to access a Web page at which selected user interface events are required to be monitored;

a browser navigation monitor component for monitoring whether a target Web page to be accessed by a user of the client belongs to Web pages required to be monitored or not;

an event configuration repository for storing event configuration information indicating what information is required to be recorded and monitored for capturing and monitoring the Web page events of the client;

an event listener register component for storing the Web page events required to be recorded and monitored and selected information thereof;

an event listener component for executing the predetermined capture script for capturing Web page event messages of the client, and performing a Web event process to generate user interface event messages;

a Web information collector component for collecting selected information from the captured Web page event messages and sending them to the event listener;

an application event pattern analyzer for analyzing captured Web page event messages and for performing a Web event process to generate at least one of user interface event messages and at least one Web application event message based on correlation patterns in said Web page event messages, wherein correlation patterns relate to at least one of a business regulation and a business processing rule, and a dispatch component for dispatching at least one of an user interface event message and a Web application event message so as to trigger a corresponding action.

12. The apparatus according to claim 11, wherein said event listener component maps the Web page event messages of the client to generate user interface event messages according to predefined mapping relationships between the Web page event messages and the user interface event messages.

13. The apparatus according to claim 11,
wherein said apparatus is included inside the client, and
wherein said client downloads a Web framework page from a server, assembles the target Web page to be accessed by the client and said downloaded Web framework page to generate an assembled HTML framework page, and displays the assembled HTML framework page on a display of the client.

14. The apparatus according to claim 11, wherein said apparatus is included inside a proxy server, and said client is set to access the Internet via the proxy server.

15. The apparatus according to claim 11,
wherein which Web page events of the client needed to be monitored and which information to be picked up and collected are preset, and said information includes session IDs, and
wherein said event listener component determines whether the user interface event messages need to be composed or not; and if it is determined that the composition is needed, composes user interface event messages based on correlation patterns, wherein correlation patterns relate to at least one of a business regulation and a business processing rule.

16. A system for capturing and analyzing Web page events of a client to generate a Web application event message in a computer network, comprising:
one or more clients computers capable of accessing a Web application server via the Internet;
an apparatus for capturing the Web page events of the client in the computer network comprising:
a browser navigation monitor for monitoring whether a target Web page to be accessed by a user of the client belongs to Web pages required to be monitored or not;
an event configuration repository storing event configuration information indicating what information is required to be recorded and monitored for capturing and monitoring the Web page events of the client;
an event listener register for storing the Web page events required to be recorded and monitored and selected information thereof;
an event listener for capturing Web page event messages of the client, analyzing the Web page event messages and performing a Web event process to generate user interface event messages; and
a Web information collector for picking up and collecting selected information from the captured Web page event messages and sending them to the event listener; and an event analyzing and integrating server having at least one processor and including apparatus for performing Web event analysis of the user interface event messages from the client to generate a Web application event message comprising:
an event repository storing mapping relationships between the user interface event messages and integration event messages;
a browser event handler for receiving user interface event messages from the client, mapping the received user interface event messages into the integration event messages according to mapping relationships stored in the event repository, and obtaining necessary selected information from the user interface event messages;
an event session manager for determining which sessions the received user interface event messages belong to according to the selected information obtained by the browser event handler, and dispatching the integration event messages to different corresponding channels depending on the different sessions to which the user interface event messages belong;
an application event pattern repository for storing correlation patterns among the integration event messages;
one or more application event pattern analyzers for identifying correlation patterns among integration event messages to determine whether the messages conform to at least one predefined correlation pattern; for determining, when messages conform to at least one predefined correlation pattern, a corresponding action to be triggered in at least one different enterprise application; and for generating a Web application event message within each channel according to the correlation patterns among the integration event messages; and
one or more application event emitter components for transmitting the Web application event message to at least one different enterprise application to trigger the corresponding action.

17. The system according to claim 16, wherein said apparatus for capturing the Web page events of the client is included inside the client.

18. The system according to claim 17,
wherein said system further comprises:
a Web framework page;
a script repository for storing a script which can be downloaded by the client and used to capture the Web page event messages of the client; and
a Web application registry registering Web pages required to be monitored therein, and
wherein said client downloads said Web framework page and the script, displays an assembled HTML framework page obtained by assembling an original target Web page and said Web framework page on a display of the client, and executes said downloaded script on said client.

19. The system according to claim 16,
wherein said apparatus for capturing the Web page events of the client is included in a proxy server, and said client is configured to access the Internet via the proxy server, and
wherein said system further comprises:
a Web application registry registering Web pages required to be monitored therein.

20. A non-transitory computer readable storage medium with computer program codes stored thereon, said computer program codes, when being executed on a computer device, causing said computer device to perform method steps for capturing Web page events of a client in a computer network, said method comprises steps performed at one of a client and a client proxy of:
obtaining event configuration information indicating Web pages at which selected user interface event messages which are to be monitored comprising downloading a predetermined capture script in response to the client's access to a Web application server through the Internet;
executing the predetermined capture script for recording and monitoring Web page events as monitoring targets among the Web page events of the client based on the event configuration information, and picking up and collecting information therefrom and capturing Web page event messages of the client and performing a Web event process to generate at least one of user interface event messages and at least one Web application event message based on correlation patterns in said Web page event messages, wherein correlation patterns relate to at least one of a business regulation and a business processing rule, and
dispatching the at least one user interface event message and at least one Web application event message so as to trigger a corresponding action.

21. A non-transitory computer readable storage medium with computer program codes stored thereon, said computer program codes, when being executed on a computer device, causing said computer device to perform method steps for performing Web event analysis of user interface event messages from a client to generate a Web application event message, said method comprising steps performed at a server of:
obtaining event configuration information indicating Web pages at which selected user interface event messages are to be monitored in response to a client request to access one of said Web pages;
sending a predetermined capture script for download at said client;
receiving selected user interface event messages based on execution of the predetermined capture script at the client;
processing the received user interface event messages to generate integration event messages;
identifying correlation patterns among integration event messages, wherein correlation patterns relate to at least one of an enterprise business regulation and an enterprise business processing rule;
determining to which sessions the received user interface event messages belong;
dispatching the integration event messages to different corresponding channels depending on the different sessions to which the received user interface event messages belong;
analyzing the integration event messages to determine whether the messages conform to at least one predefined correlation pattern;
when messages conform to at least one predefined correlation pattern, determining a corresponding action to be triggered in at least one different enterprise application;
generating a Web application event message within each channel according to correlation patterns among the integration event messages, and
transmitting the Web application event message to at least one different enterprise application to trigger the corresponding action.

* * * * *